US011340747B1

(12) United States Patent
Lin et al.

(10) Patent No.: US 11,340,747 B1
(45) Date of Patent: May 24, 2022

(54) TOUCH SENSOR AND TOUCH DISPLAY MODULE

(71) Applicant: TPK Advanced Solutions Inc., Fujian (CN)

(72) Inventors: Chia-Jui Lin, Taoyuan County (TW); Wei-Chuan Chao, New Taipei (TW); Shao-Jie Liu, Xiamen (CN); Si-Qiang Xu, Xiamen (CN)

(73) Assignee: TPK Advanced Solutions Inc., Xiamen (CN)

( * ) Notice: Subject to any disclaimer, the term of this patent is extended or adjusted under 35 U.S.C. 154(b) by 0 days.

(21) Appl. No.: 17/192,974

(22) Filed: Mar. 5, 2021

(51) Int. Cl.
*G06F 3/041* (2006.01)
*G06F 3/044* (2006.01)

(52) U.S. Cl.
CPC .......... *G06F 3/0446* (2019.05); *G06F 3/0445* (2019.05); *G06F 2203/04111* (2013.01)

(58) Field of Classification Search
CPC ................. G06F 3/0446; G06F 3/0445; G06F 2203/04111
See application file for complete search history.

(56) References Cited

U.S. PATENT DOCUMENTS

2020/0225784 A1 7/2020 Hwangbo et al.
2021/0397320 A1* 12/2021 Ye ........................ G06F 3/0446

FOREIGN PATENT DOCUMENTS

CN 109164945 A 1/2019
CN 111796723 A 10/2020

* cited by examiner

*Primary Examiner* — Deeprose Subedi
(74) *Attorney, Agent, or Firm* — Cooper Legal Group, LLC

(57) ABSTRACT

A touch sensor having a visible area and a peripheral area on at least one side of the visible area includes a substrate and a first touch electrode layer. The substrate has a hole area corresponding to the visible area, and the hole area has a first edge. The first touch electrode layer is disposed on the substrate and corresponding to the visible area. The first touch electrode layer includes a first electrode line extending along a first direction, and the first electrode line has a first portion close to the hole area and a second portion far from the hole area along the first direction. The first portion of the first electrode line is connected to the second portion of the first electrode line, and the first portion of the first electrode line is disposed adjacent to the first edge along a contour of the hole area.

20 Claims, 8 Drawing Sheets

TOUCH SENSOR AND TOUCH DISPLAY MODULE

BACKGROUND

Field of Disclosure

The present disclosure relates to a touch sensor and a touch display module including the touch sensor.

Description of Related Art

With the rapid development of technology, touch display functions have been integrated into various electronic devices (e.g., mobile phones, tablet computers, etc.). A display surface of the electronic device includes a visible area and a peripheral area, in which the peripheral area is usually disposed around the visible area, and a range of the peripheral area is defined by the position of the shielding layer, such that the shielding layer shields some peripheral wires and components corresponding to the peripheral area of the electronic device.

For example, the peripheral wires of a touch panel of the electronic device are disposed corresponding to the peripheral area to prevent from being seen and affecting the visual effect. In addition, the electronic device usually includes optical components, such as front lenses, light sensors, etc., which are also disposed in the peripheral area and occupy a lot more spaces of the peripheral area. Accordingly, the size of the peripheral area is unlikely to be reduced, and hence the electronic device is unable to meet the design requirement of narrow bezel. Furthermore, since the arrangement of optical components will cause the problem of mechanism interference, the circuit layout of the touch panel will be affected. Therefore, how to provide a touch panel that can maintain the touch sensing function while meeting the requirement of narrow bezel for the electronic device is one of the current directions to development.

SUMMARY

According to some embodiments of the present disclosure, a touch sensor having a visible area and a peripheral area on at least one side of the visible area includes a substrate and a first touch electrode layer. The substrate has a hole area corresponding to the visible area, and the hole area has a first edge. The first touch electrode layer is disposed on the substrate and corresponding to the visible area. The first touch electrode layer includes a first electrode line extending along a first direction, and the first electrode line has a first portion close to the hole area and a second portion far from the hole area along the first direction. The first portion of the first electrode line is connected to the second portion of the first electrode line, and the first portion of the first electrode line is disposed adjacent to the first edge along a contour of the hole area.

In some embodiments of the present disclosure, the first touch electrode layer includes a matrix and a plurality of metal nanostructures distributed in the matrix.

In some embodiments of the present disclosure, the hole area further has a second edge, and a portion of the second edge and a portion of the first edge are located on opposite sides of the hole area.

In some embodiments of the present disclosure, the first touch electrode layer further includes a second electrode line extending along the first direction, the second electrode line is disposed adjacent to and spaced apart from the first electrode line, the second electrode line has a first portion close to the hole area and a second portion far from the hole area along the first direction, the first portion of the second electrode line is connected to the second portion of the second electrode line, and the first portion of the second electrode line is disposed adjacent to the second edge along the contour of the hole area.

In some embodiments of the present disclosure, a distance between the first portion of the first electrode line and the first portion of the second electrode line is greater than a distance between the second portion of the first electrode line and the second portion of the second electrode line.

In some embodiments of the present disclosure, at least a portion of the first portion of the first electrode line is spaced apart from at least a portion of the first portion of the second electrode line by the hole area.

In some embodiments of the present disclosure, the second portion of the first electrode line and the second portion of the second electrode line are substantially parallel.

In some embodiments of the present disclosure, a distance between the first portion of the first electrode line and the first edge of the hole area is between 100 µm and 400 µm, and a distance between the first portion of the second electrode line and the second edge of the hole area is between 100 µm and 400 µm.

In some embodiments of the present disclosure, a connection of the first portion of the first electrode line and the second portion of the first electrode line has a round corner, and a connection of the first portion of the second electrode line and the second portion of the second electrode line has a round corner.

In some embodiments of the present disclosure, the first electrode line includes a plurality of branch lines disposed at intervals, and the branch lines are connected in parallel.

In some embodiments of the present disclosure, when the branch lines simultaneously encounter the hole area along the first direction, and the branch lines are combined together to be adjacent to the first edge of the hole area along the contour of the hole area.

In some embodiments of the present disclosure, the first electrode line of the first touch electrode layer further has a third portion, the second portion of the first electrode line and the third portion of the first electrode line constitute two of the branch lines of the first electrode line, and the third portion is connected to the first portion of the first electrode line, such that the first portion of the first electrode line constitutes a portion which the branch lines are combined together into.

In some embodiments of the present disclosure, the touch sensor further includes a second touch electrode layer, the substrate has a first surface and a second surface facing away from the first surface, and the first touch electrode layer and the second touch electrode layer are respectively disposed on the first surface and the second surface of the substrate; or the first touch electrode layer and the second touch electrode layer are disposed on a side of the first surface or the second surface of the substrate, and electrically insulated by an insulating layer.

In some embodiments of the present disclosure, the second touch electrode layer includes a fifth electrode line extending along a second direction, the second direction is perpendicular to the first direction, the fifth electrode line has a first portion close to the hole area and a second portion far from the hole area along the second direction, the first portion of the fifth electrode line is connected to the second portion of the fifth electrode line, and the first portion of the fifth electrode line is disposed adjacent to an edge of the hole area along the contour of the hole area.

According to the aforementioned embodiments of the present disclosure, a touch display module includes a display panel and the aforementioned touch sensor on the display panel.

In some embodiments of the present disclosure, the touch display module further includes a cover disposed on the touch sensor.

In some embodiments of the present disclosure, the touch display module further includes a polarizing layer disposed between the display panel and the touch sensor, or between the touch sensor and the cover.

In some embodiments of the present disclosure, the display panel has a hole corresponding to the hole area.

In some embodiments of the present disclosure, the touch display module further includes an optical component accommodated in the hole.

According to the aforementioned embodiments of the present disclosure, since the touch sensor of the present disclosure has a hole area disposed corresponding to the visible area, when the touch sensor is integrated into a touch display module with optical functions, the optical components of the touch display module (e.g., the lens) can be disposed corresponding to the hole area. As a result, spaces in the peripheral area for disposing the optical components can be saved, and the design requirement of narrow bezel for the touch display module is further achieved. In addition, since the optical components of the touch display module are disposed corresponding to the visible area, the arrangement of the peripheral wires in the peripheral area of the touch sensor does not need to avoid the position of the optical components, and the bending of the peripheral area is not restricted by the optical components. Accordingly, the touch sensor is able to achieve diversified bending designs. On the other hand, through the arrangement of the touch electrodes and the design of the electrode patterns in the touch electrode layer, the touch electrodes can maintain a good touch function while bypassing the hole area.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
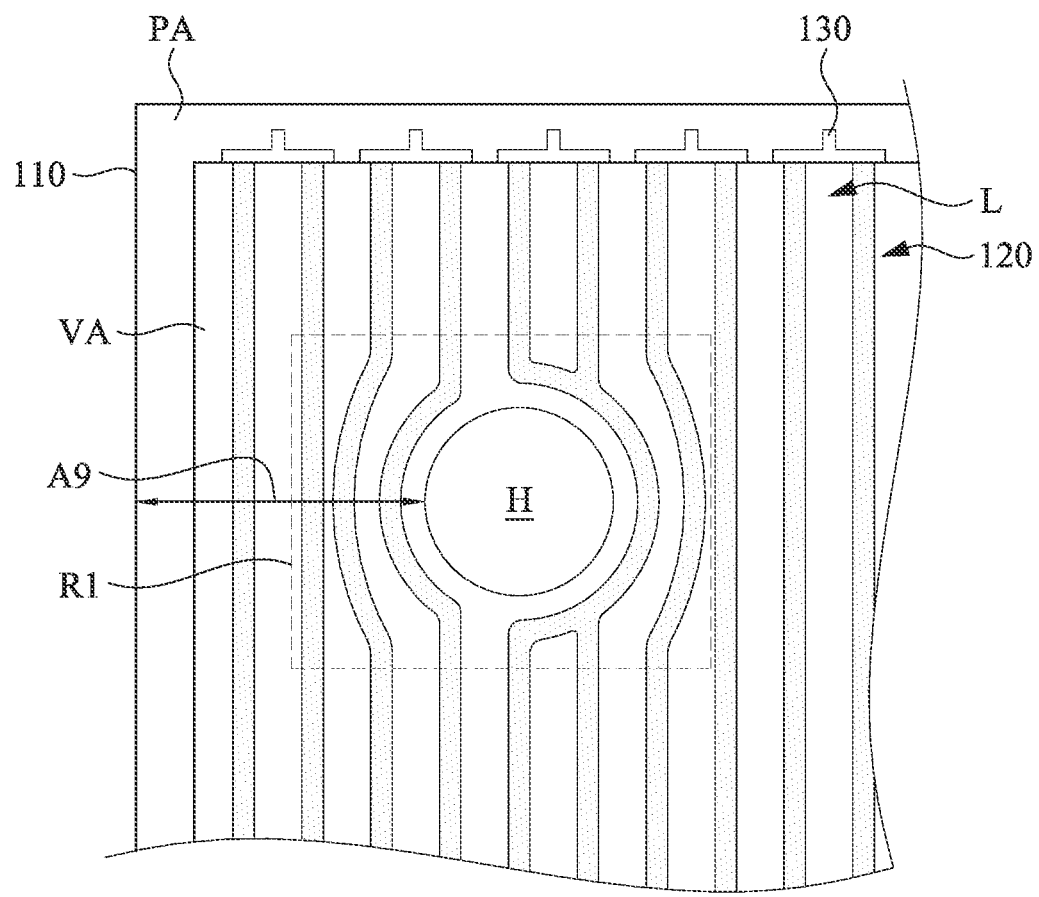
FIG. 1 is a top view illustrating a touch sensor according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

It should be understood that although the terms "first", "second", and "third" may be used herein to describe various elements, components, regions, layers, and/or portions, these elements, components, regions, layers, and/or portions should not be restricted by these terms. These terms are only used to distinguish one element, component, region, layer, or portion from another element, component, region, layer, or portion. Therefore, the "first element", "first component", "first region", "first layer", or "first portion" described below can also be referred to as a second element, second component, second region, second layer, or second portion without departing from the teachings herein.

In addition, relative terms such as "lower" or "bottom" and "upper" or "top" can be used herein to describe the relationship between one element and another element, as shown in the figure. It should be understood that relative terms are intended to include different orientations of the device other than those shown in the figures. For example, if the device in one figure is turned over, elements described as being on the "lower" side of other elements will be oriented on the "upper" side of the other elements. Therefore, the exemplary term "lower" may include an orientation of "lower" and "upper", depending on the specific orientation of the drawing. Similarly, if the device in one figure is turned over, elements described as "below" other elements will be oriented "above" the other elements. Therefore, the exemplary term "below" can include an orientation of "above" and "below".

The present disclosure provides a touch sensor having a hole area disposed corresponding to a visible area and a touch display module integrated with the touch sensor. When the touch sensor is integrated into the touch display module, the optical components of the touch display module can be disposed corresponding to the hole area. Accordingly, spaces in the peripheral area for disposing the optical components can be saved, such that the design requirement of narrow bezel for the touch display module is further achieved. In addition, through the arrangement of the touch electrodes and the design of the electrode patterns in the touch electrode layer, the touch electrodes can maintain a good touch function while bypassing the hole area.

FIG. 1 is a top view illustrating a touch sensor 100 according to some embodiments of the present disclosure. The touch sensor 100 includes a substrate 110, a first touch electrode layer 120, and a peripheral circuit layer 130. The touch sensor 100 has a visible area VA and a peripheral area PA, and the peripheral area PA is disposed on sides of the visible area VA. For example, the peripheral area PA may be a frame-shaped area disposed around (i.e., including the right, left, upper, and lower sides of) the visible area VA. As another example, the peripheral area PA may be an L-shaped area disposed on the left and lower sides of the visible area VA. In some embodiments, the substrate 110 is configured to support the first touch electrode layer 120 and the peripheral circuit layer 130, and may be, for example, a rigid transparent substrate or a flexible transparent substrate. Specifically, a material of the substrate 110 includes, but is not limited to, transparent materials such as glass, acrylic, polyvinyl chloride, cycloolefin polymer, cycloolefin copolymer, polypropylene, polystyrene, polycarbonate, polyethylene terephthalate, polyethylene naphthalate, colorless polyimide, or combinations thereof.

In some embodiments, the substrate 110 is provided with a hole area H corresponding to the visible area VA. When the touch sensor 100 of the present disclosure is integrated into a device with optical functions (e.g., a display, a portable phone, or a tablet computer), an optical component of the device can be installed at a position corresponding to the hole area H. That is, there is no need for reserving spaces corresponding to the peripheral area PA of the device for installing the optical component, thereby meeting the design requirement of narrow bezel for the device. Compared to the conventional device in which the optical component is disposed corresponding to the peripheral area PA, the bezel size of the device of the present disclosure can be reduced (e.g., a width of the peripheral area PA can be reduced) by about 150% or more. In detail, when the touch sensor 100 of the present disclosure is integrated into a device with optical functions, the width of the peripheral area PA of the device can be designed to be about 1 mm to 3 mm. It should be understood that the hole area H of the substrate 110 of the present disclosure may be a solid area corresponding to the optical component, or may be a through hole corresponding to the optical component. Specific details and features of the hole area H will be described in more detail in the following descriptions.

In some embodiments, the first touch electrode layer 120 is disposed on the substrate 110 and corresponding to the visible area VA, and the peripheral circuit layer 130 is disposed on the substrate 110 and corresponding to the peripheral area PA. In some embodiments, the first touch electrode layer 120 may include a plurality of strip-shaped electrode lines L extending along the first direction D1 after being patterned, and the strip-shaped electrode lines L may be disposed at intervals along a second direction D2, in which the first direction D1 is perpendicular to the second direction D2. In addition, the first touch electrode layer 120 may further extend into the peripheral area PA and contact the peripheral circuit layer 130 to form an electrical connection.

In some embodiments, the first touch electrode layer 120 may include a matrix and a plurality of metal nanowires (also called metal nanostructures) distributed in the matrix. The matrix may include polymers or mixtures thereof to impart specific chemical, mechanical, and optical properties to the metal nanowires. For example, the matrix can provide good adhesion between the metal nanowires and the substrate 110. As another example, the matrix can also provide good mechanical strength for the metal nanowires. In some embodiments, the matrix may include a specific polymer, such that the metal nanowires have additional scratch/wear-resistant surface protection, thereby improving the surface strength of the first touch electrode layer 120. The foregoing specific polymer may be, for example, polyacrylate, epoxy resin, polyurethane, polysiloxane, polysilane, poly (silicon-acrylic acid), or combinations thereof. In some embodiments, the matrix may further include a surfactant, a cross-linking agent, a stabilizer (including but not limited to, for example, an antioxidant or an ultraviolet stabilizer), a polymerization inhibitor, or combinations of any of the foregoing ingredients, in order to improve the ultraviolet resistance of the first touch electrode layer 120 and prolong its service life.

It should be understood that the term "metal nanowire" used herein is a collective noun, which refers to a collection of metal wires that include multiple metal elements, metal alloys, or metal compounds (including metal oxides), and the number of metal nanowires included therein does not affect the scope of the present disclosure. In some embodiments, a cross-sectional size (e.g., a diameter of the cross section) of a single metal nanowire can be less than 500 nm, preferably less than 100 nm, and more preferably less than 50 nm. In some embodiments, the metal nanowire has a large aspect ratio (i.e., length:diameter of the cross section). Specifically, the aspect ratio of the metal nanowire may be between 10 and 100,000. In more detail, the aspect ratio of the metal nanowire may be greater than 10, preferably greater than 50, and more preferably greater than 100. Moreover, other terms such as silk, fiber, or tube also have the aforementioned cross-sectional dimensions and aspect ratios, which also fall within the scope of the present disclosure.

Figure 2A:
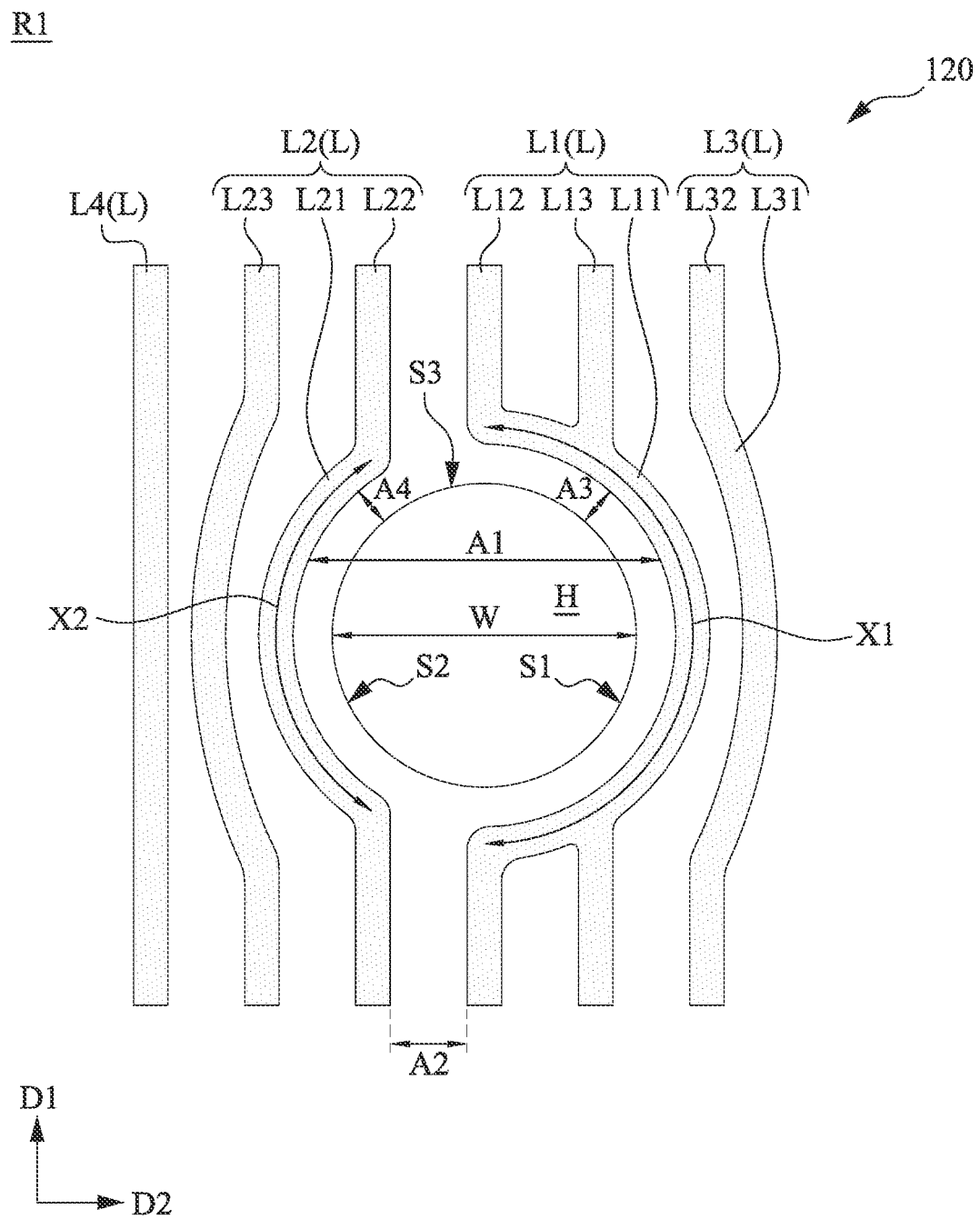
FIG. 2A is a partial enlargement view illustrating the region R1 of the touch sensor in FIG. 1 according to some embodiments of the present disclosure.

FIG. 2A is a partial enlargement view illustrating the region R1 of the touch sensor 100 in FIG. 1 according to some embodiments of the present disclosure. Reference is made to FIG. 1 and FIG. 2A. In some embodiments, the electrode lines L may extend from an upper boundary of the visible area VA to a lower boundary of the visible area VA along the first direction D1, and are disposed at intervals corresponding to the visible area VA along the second direction D2. In some embodiments, a line width of each electrode line L may be between 1 μm and 200 μm, and a distance between the adjacent electrode lines L (i.e., the line pitch) may be between 10 μm and 400 μm, so as to provide lower line resistance and higher light transmittance. As mentioned above, since the substrate 110 of the touch sensor 100 has the hole area H corresponding to the visible area VA, the electrode lines L adjacent to the hole area H can be configured to have good compatibility with the hole area H. In more detail, the electrode lines L adjacent to the hole area H can be particularly configured to avoid blocking the hole area H, and can also be particularly configured to maintain the line resistance required by the design. Specific configurations of each electrode line L and the correlation between such configurations and the aforementioned effects will be described in more detail in the following descriptions.

In some embodiments, as in the configuration of FIG. 2A, the first touch electrode layer 120 includes a first electrode line L1 adjacent to the hole area H. In some embodiments, the first electrode line L1 has a first portion L11 closer to the hole area H and a second portion L12 farther from the hole area H along the first direction D1, and the first portion L11 is connected to the second portion L12. In more detail, the first portion L11 of the first electrode line L1 is directly adjacent to a first edge S1 of the hole area H, and is adjacent to the first edge S1 of the hole area H along a contour of the hole area H, while the second portion L12 of the first electrode line L1 is not directly adjacent to the first edge S1 of the hole area H, and is substantially straight. It should be noted that "two elements (or two portions) being directly adjacent to each other" used hereinafter refers to there being no other elements (or other portions) between the two elements (or the two portions). In some embodiments, the first electrode line L1 may have two second portions L12 respectively connecting to two ends of the first portion L11 along the first direction D1, and the two second portions L12 are substantially aligned with each other along the first direction D1.

In some embodiments, the first electrode line L1 includes a plurality of branch lines disposed at intervals, and the branch lines are connected in parallel. Specifically, the first electrode line L1 further has a third portion L13, and the second portion L12 and the third portion L13 of the first electrode line L1 constitute two of the branch lines of the first electrode line L1. That is, the second portion L12 and the third portion L13 of the first electrode line L1 are disposed in parallel and spaced apart from each other, and are connected in parallel (i.e., the second portion L12 and the third portion L13 of the first electrode line L1 are connected to the same peripheral line). On the other hand, when the branch lines simultaneously encounter the hole area H along the first direction D1, the branch lines are combined together to be adjacent to the first edge S1 of the hole area H along a contour of the hole area H. Specifically, the third portion L13 of the first electrode line L1 is connected to the first portion L11 of the first electrode line L1, such that when the second portion L12 and the third portion L13 of the first electrode line L1 encounter the hole area H simultaneously, the second portion L12 and the third portion L13 of the first electrode line L1 can be combined together into the first portion L11 of the first electrode line L1 to be adjacent to the first edge S1 of the hole area H along a contour of the hole area H. In other words, the first portion L11 of the first electrode line L1 constitutes a portion in which the branch lines are combined together into. In some embodiments, the first electrode line L1 may have two third portions L13 respectively connecting to two ends of the first portion L11 along the first direction D1, and the two third portions L13 are substantially aligned with each other along the first direction D1.

In some embodiments, the first touch electrode layer 120 further includes a second electrode line L2 adjacent to the hole area H. The second electrode line L2 also has a first portion L21 closer to the hole area H and a second portion L22 farther from the hole area H along the first direction D1, and the first portion L21 is connected to the second portion L22. In some embodiments, the hole area H further has a second edge S2, and a portion of the second edge S2 and a portion of the first edge S1 are located on opposite sides of the hole area H, in which the first portion L21 of the second electrode line L2 is directly adjacent to the second edge S2 of the hole area H, and is adjacent to the second edge S2 of the hole area H along a contour of the hole area H, while the second portion L22 of the second electrode line L2 is not directly adjacent to the second edge S2 of the hole area H, and is substantially straight. In other words, at least a portion of the first portion L11 of the first electrode line L1 is spaced apart from at least a portion of the first portion L21 of the second electrode line L2 by the hole area H. In some embodiments, the second portion L22 of the second electrode line L2 is substantially in parallel with the second portion L12 of the first electrode line L1 (e.g., the second portion L22 of the second electrode line L2 and second portion L12 of the first electrode line L1 are in parallel with each other along the first direction D1). Based on the above, the second electrode line L2 and the first electrode line L1 can bypass the hole area H to avoid blocking the hole area H and the optical components disposed corresponding to the hole area H.

In some embodiments, the second electrode line L2 includes a plurality of branch lines disposed at intervals, and the branch lines are connected in parallel. Specifically, the second electrode line L2 further has a third portion L23, the first portion L21 is connected to the second portion L22 of the second electrode line L2 to constitute one of the branch lines of the second electrode line L2, and the third portion L23 constitutes another of the branch lines of the second electrode line L2, in which the two branch lines are disposed at intervals. It should be noted that since the two branch lines of the second electrode line L2 do not simultaneously encounter the hole area H while extending along the first direction D1, there is no need for the two branch lines of the second electrode line L2 to be combined together into one.

In some embodiments, a maximum width W of the hole area H along the second direction D2 is greater than a distance A2 between the second portion L12 of the first electrode line L1 and the second portion L22 of the second electrode line L2. Therefore, when the first electrode line L1 and the second electrode line L2 bypass the hole area H, a distance A1 between the first portion L11 of the first electrode line L1 and the first portion L21 of the second electrode line L2 is greater than a distance A2 between the second portion L12 of the first electrode line L1 and the second portion L22 of the second electrode line L2. In the embodiment of FIG. 2A, since the hole area H has a circular shape, the maximum width W of the hole area H refers to the diameter of the circular shape.

In some embodiments, a third edge S3 is between the first edge S1 and the second edge S2 of the hole area H, and the first edge S1, the second edge S2, and the third edge S3 may be connected to each other to jointly form a closed hole area H. In some embodiments, the third edge S3 of the hole area H may be exposed by a space between the first electrode line L1 and the second electrode line L2. In more detail, the first portion L11 of the first electrode line L1 and the first portion L21 of the second electrode line L2 are not adjacent to the third edge S3 of the hole area H along a contour of the hole area H. In other words, the first electrode line L1 and the second electrode line L2 are only adjacent to a portion of the edge of the hole area H along a contour of the hole area H. In some embodiments, the first portion L11 of the first electrode line L1 and the first portion L21 of the second electrode line L2 may have different line lengths. For example, a line length X1 of the first portion L11 of the first electrode line L1 may be greater than a line length X2 of the first portion L21 of the second electrode line L2, and in this case, a length of the first edge S1 is greater than a length of the second edge S2 (as in the embodiment of FIG. 2A).

In some embodiments, a connection between the first portion L11 and the second portion L12 of the first electrode line L1 may have a round corner, and a connection between the first corner L21 and the second corner L22 of the second electrode line L2 may also have a round corner. The design of round corner can prevent the first electrode line L1 and the second electrode line L2 from excessively radiating heat due to current accumulation at the connection (i.e., a position near the hole area H), thereby reducing the occurrence of thermal effects and maintaining normal touch sensing functions. In some embodiments, a distance A3 between the first portion L11 of the first electrode line L1 and the first edge S1 of the hole area H is between 100 µm and 400 µm, and a distance A4 between first portion L21 of the second electrode line L2 and the second edge S2 of the hole area H is between 100 µm and 400 µm. The above distances enable the touch sensor 100 to be provided with touch resolution, reliability, and production yield. In detail, when the above distances are less than 100 µm, the production yield is reduced due to enhancement in difficulties to the patterning of the first portion L11 of the first electrode line L1 and the first portion L21 of the second electrode line L2; when the above distances are greater than 400 µm, the arrangement of the electrode lines L near the hole area H may be too sparse to provide touch functions, which leads to reduction of touch resolution.

In some embodiments, the first touch electrode layer 120 may further include a third electrode line L3 directly adjacent to the first electrode line L1 on a side of the first electrode line L1 facing away from the second electrode line L2. The third electrode line L3 has a first portion L31 and a second portion L32 connected to each other, in which the first portion L31 of the third electrode line L3 is adjacent to the first portion L11 of the first electrode line L1, and the second portion L32 of the third electrode line L3 is adjacent to the third portion L13 of the first electrode line L1. In some embodiments, the first portion L31 of the third electrode line L3 substantially extends along the first portion L11 of the first electrode line L1, and the second portion L32 of the third electrode line L3 may be substantially in parallel with the third portion L13 of the first electrode line L1. Compared to the first electrode line L1, the third electrode line L3 is farther from the hole area H, and will not encounter the hole area H when extending along the first direction D1. Therefore, the third electrode line L3 is designed to extend on the premise of keeping a distance required for touch sensing from the first electrode line L1. A bending degree of the first portion L31 of the third electrode line L3 is smaller than a bending degree of the first portion L11 of the first electrode line L1 (i.e., a shape of the first portion L31 of the third electrode line L3 is closer to a straight line). On the other hand, a connection between the first portion L31 and the second portion L32 of the third electrode line L3 may have a round corner, so as to prevent the third electrode line L3 from excessively radiating heat due to current accumulation at the connection, thereby reducing the occurrence of thermal effects.

In some embodiments, the first touch electrode layer 120 further includes a fourth electrode line L4 directly adjacent to the second electrode line L2 on a side of the second electrode line L2 facing away from the first electrode line L1. Since the fourth electrode line L4 does not encounter the hole area H when extending along the first direction D1 and the fourth electrode line L4 also keeps a distance required for touch sensing from the second electrode line L2 (the third portion L23 of the second electrode line L2), the fourth electrode line L4 can be a straight line extending along the first direction D1.

It should be understood that in addition to the electrode lines L (i.e., the first electrode line L1 to the fourth electrode line L4) adjacent to the hole area H, other electrode lines L in the first touch electrode layer 120 farther from the hole area H can be disposed at intervals along the second direction D2 on a side of the third electrode line L3 facing away from the hole area H and a side of the fourth electrode line L4 facing away from the hole area H, and a shape of each electrode line L is substantially straight.

It is supplemented that since the first electrode line L1 in this embodiment adopts a design in which the two branch lines are combined into one, the line resistance of the first electrode line L1 is higher than the line resistance of other electrode lines (e.g., the second electrode line L2) in which the two branch lines are not combined into one. However, the first touch electrode layer 120 can adopt a conductive layer which is a metal nanowire layer with a lower surface resistance specification, so as to maintain the line resistance of each electrode line L of the first touch electrode layer 120 to be near a lower limit of the sensing range of a controller. As such, even if the first electrode line L1 has a higher line resistance due to the design of the two branch lines being combined into one, such line resistance can still be maintained within the range that can be sensed by the controller.

Figure 2B:
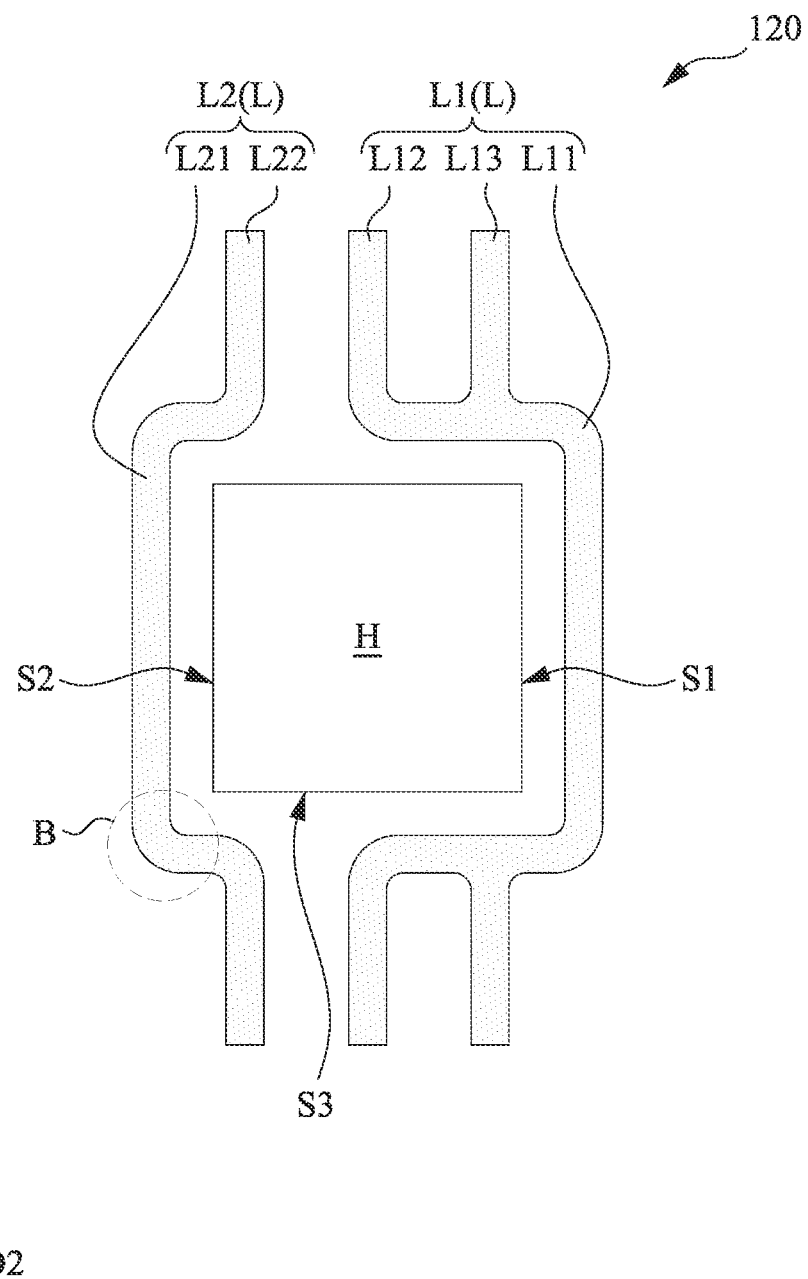
FIG. 2B and FIG. 2C are partial enlargement views illustrating the region R1 of the touch sensor in FIG. 1 according to some other embodiments of the present disclosure.
Figure 2C:
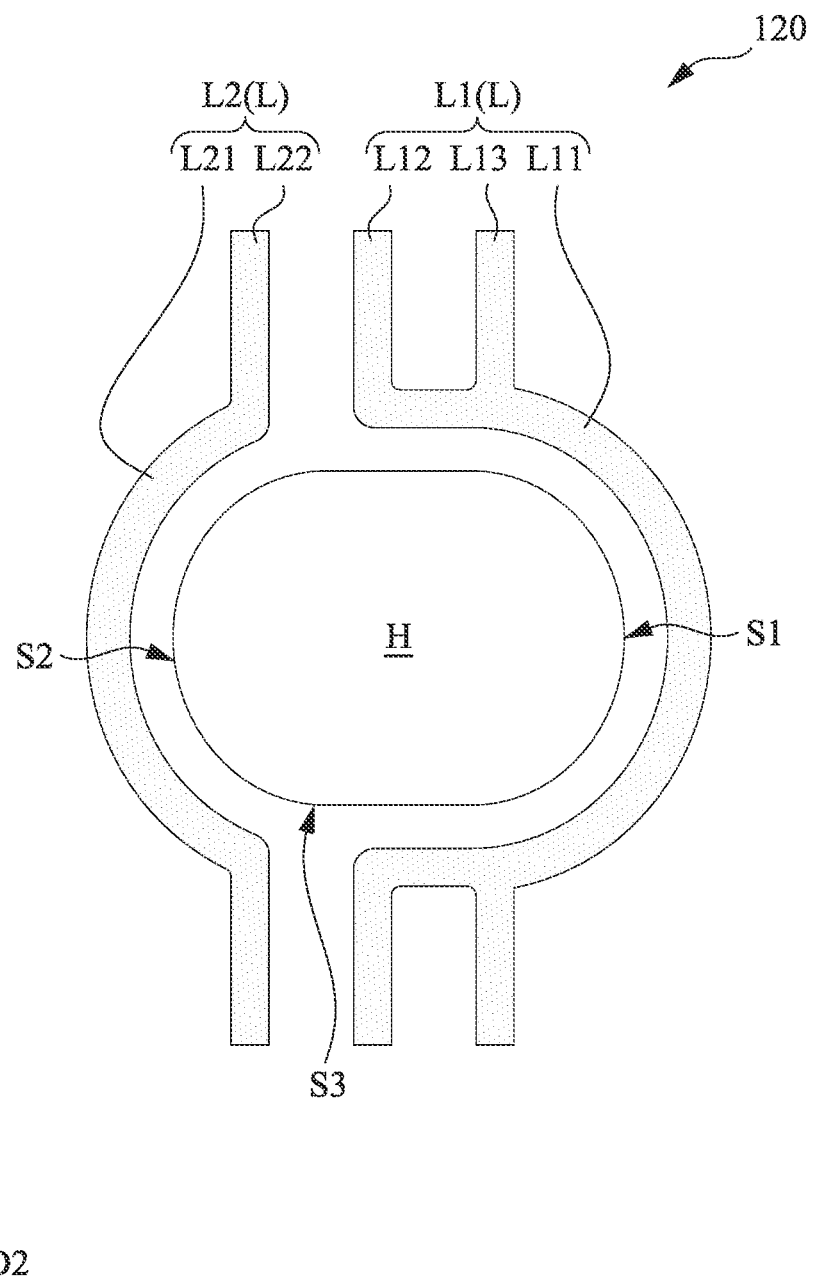

FIG. 2B and FIG. 2C are partial enlargement views illustrating the region R1 of the touch sensor 100 in FIG. 1 according to some other embodiments of the present disclosure. It should be understood that the touch sensors 100 of FIG. 2B and FIG. 2C and the touch sensor 100 of FIG. 2A have substantially the same component configuration and connection relationships, materials, and advantages, which will not be repeated hereinafter, and only the differences will be discussed in the following descriptions. In addition, in order to simplify the drawings, some of the electrode lines L are omitted in FIG. 2B and FIG. 2C, and only the first electrode line L1 and a portion of the second electrode line L2 that are the closest to the hole area H are shown.

Reference is made to FIG. 2B. At least one difference between the touch sensor 100 shown in FIG. 2B and the touch sensor 100 shown in FIG. 2A lies in the shape of the hole area H. Specifically, the hole area H in the touch sensor 100 of FIG. 2B has a rectangular (square) shape. In this embodiment, the first portion L11 of the first electrode line L1 and the first portion L21 of the second electrode line L2 are respectively disposed adjacent to the first edge S1 and the second edge S2 of the hole area H along a contour of the hole area H to form a rectangle-like shape. Since the hole area H has a rectangular shape in this embodiment, each of the first portion L11 of the first electrode line L1 and the first portion L21 of the second electrode line L2 has more than one bending portion B. In some embodiments, the bending portion B may have a round corner to prevent the first electrode line L1 and the second electrode line L2 from excessively radiating heat due to current accumulation at the bending portion B, thereby reducing the occurrence of thermal effects and maintaining normal touch sensing functions.

Reference is made to FIG. 2C. At least one difference between the touch sensor 100 shown in FIG. 2C and the touch sensor 100 shown in FIG. 2A also lies in the shape of the hole area H. Specifically, the hole area H in the touch sensor 100 of FIG. 2C has a pill shape. In more detail, the pill shape includes one rectangle and two semicircles, and the rectangle is sandwiched between the two semicircles. In this embodiment, the first portion L11 of the first electrode line L1 and the first portion L21 of the second electrode line L2 are respectively disposed adjacent to the first edge S1 and the second edge S2 of the hole area H along a contour of the hole area H to form a pill-like shape. Since the hole area H has a pill-like shape in this embodiment, shapes of the first portion L11 of the first electrode line L1 and the first portion L21 of the second electrode line L2 are respectively smooth curves (i.e., without edge angles). As such, the first electrode line L1 and the second electrode line L2 can be prevented from excessively radiating heat due to current accumulation, thereby reducing the occurrence of thermal effects and maintaining normal touch sensing functions.

It should be understood that the shapes of the hole area H shown in FIG. 2A to FIG. 2C are only exemplary embodiments, and the present disclosure is not limited thereto. In some other embodiments, the hole area H can also have other appropriate shapes (e.g., an ellipse, a polygon, etc.), and each electrode line L can also be appropriately configured to match the shape of the hole area H. In the following descriptions, touch sensors according to other embodiments of the present disclosure will be described.

Figure 3:
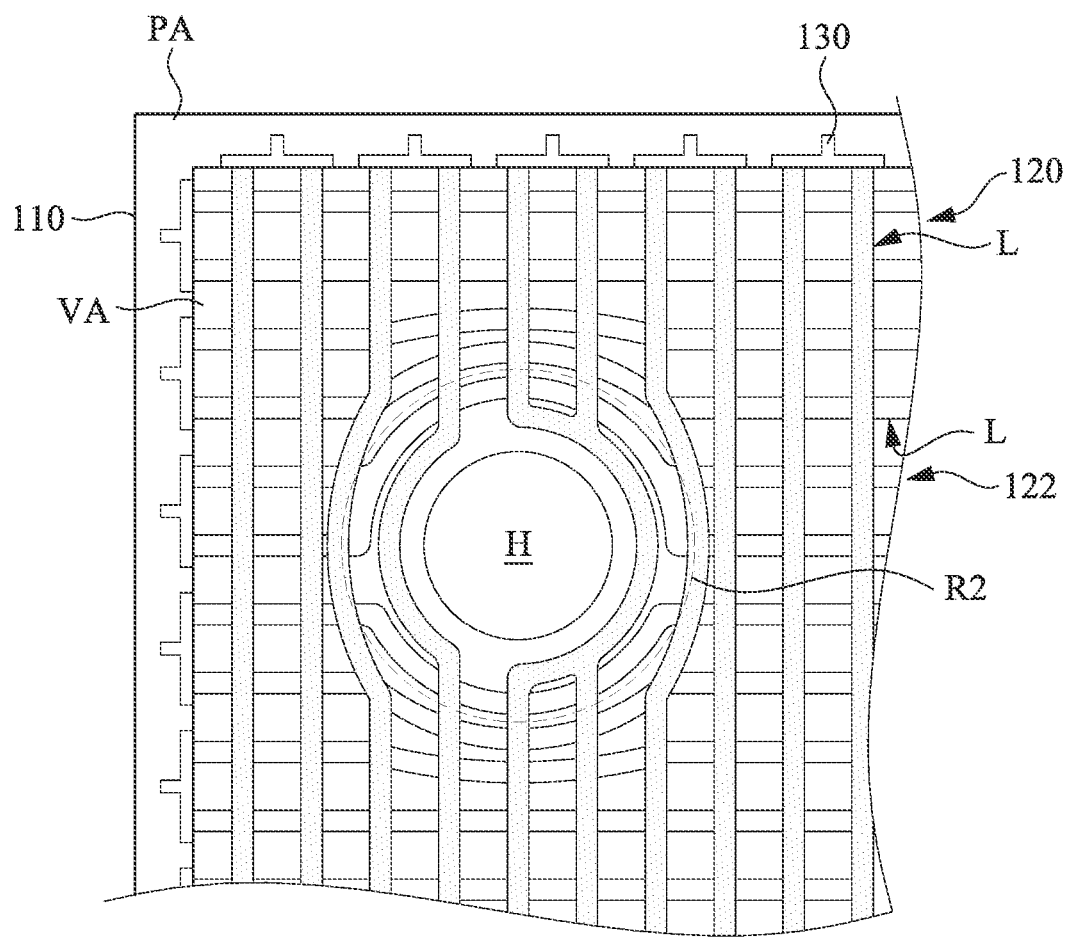
FIG. 3 is a top view illustrating a touch sensor according to some other embodiments of the present disclosure.
Figure 3:
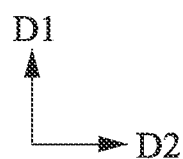
Figure 4:
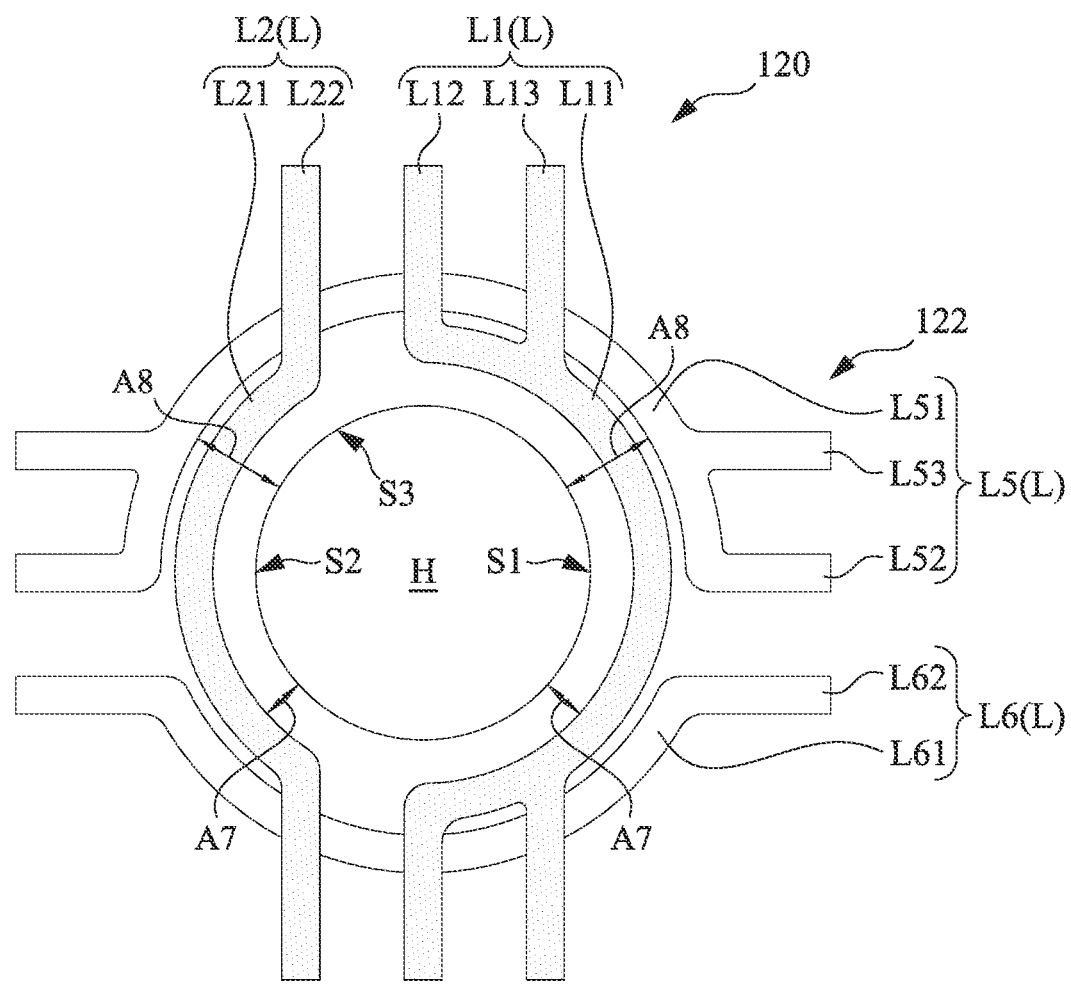
FIG. 4 is a partial enlargement view illustrating the region R2 of the touch sensor in FIG. 3 according to some embodiments of the present disclosure.

FIG. 3 is a top view illustrating a touch sensor 100a according to some other embodiments of the present disclosure. FIG. 4 is a partial enlargement view illustrating the region R2 of the touch sensor 100 in FIG. 3 according to some embodiments of the present disclosure. Reference is made to FIG. 3 and FIG. 4. In the embodiment of FIG. 3 and FIG. 4, the touch sensor 100a further includes a second touch electrode layer 122, and the first touch electrode layer 120 and the second touch electrode layer 122 are configured to form a double-sided single-layer electrode structure. More specifically, the first touch electrode layer 120 is disposed on a first surface (e.g., an upper surface) of the substrate 110, and the second touch electrode layer 122 is disposed on a second surface (e.g., a lower surface) of the substrate 110, such that the first touch electrode layer 120 and the second touch electrode layer 122 are electrically insulated from each other. In some embodiments, the second touch electrode layer 122 also has an electrode pattern arranged by a plurality of electrode lines L, and the aforementioned metal nanowires and matrix are in each electrode line L of the second touch electrode layer 122. In some embodiments, each electrode line L of the second touch electrode layer 122 may extend from a left boundary of the visible area VA to a right boundary of the visible area VA along the second direction D2, and are disposed at intervals corresponding to the visible area VA along the first direction D1. In other words, the electrode lines L of the first touch electrode layer 120 and the electrode lines L of the second touch electrode layer 122 extend in different directions and are perpendicular to each other. As such, touch sensing functions can be performed by detecting signal changes (e.g., changes in capacitance) between the first touch electrode layer 120 and the second touch electrode layer 122.

In some embodiments, the second touch electrode layer 122 includes a fifth electrode line L5 and a sixth electrode line L6 adjacent to opposite sides of the hole area H, the fifth electrode line L5 and the sixth electrode have first portions L51, L61 closer to the hole area H and second portions L52, L62 farther from the hole area H along the second direction D2. The first portion L51 and the second portion L52 of the fifth electrode line L5 are connected to each other, and the first portion L61 and the second portion L62 of the sixth electrode line L6 are also connected to each other. Since the fifth electrode line L5 and the sixth electrode line L6 of the second touch electrode layer 122 extend along the second direction D2, the first portions L51, L61 of the fifth electrode line L5 and the sixth electrode line L6 are disposed adjacent to the third edge S3 and portions of the of the first edge S1 and the second edge S2 of the hole area H along a contour of the hole area H. It should be understood that the difference between the second touch electrode layer 122 and the first touch electrode layer 120 lies only in their extending direction and arrangement direction, and that the component configuration and connection relationships, materials, and advantages of the second touch electrode layer 122 and the first touch electrode layer 120 are substantially the same, which will not be repeated hereinafter. For example, the fifth electrode line L5 and the sixth electrode line L6 of the second touch electrode layer 122 respectively have the same component configuration, materials, and advantages as the first electrode line L1 and the second electrode line L2 of the first touch electrode layer 120.

On the other hand, in order to meet the requirements of capacitance sensing, the first touch electrode layer 120 and the second touch electrode layer 122 are partially staggered (i.e., not completely overlapped) along a direction perpendicular to an extending direction of the substrate 110. From the perspective of the first electrode line L1 and the second electrode line L2 of the first touch electrode layer 120 as well as the fifth electrode line L5 and the sixth electrode line L6 of the second touch electrode layer 122, the second portions L12, L22 of the first electrode line L1 and the second electrode line L2 partially overlap the first portions L51, L61 of the fifth electrode line L5 and the sixth electrode line L6, while the first portions L11, L21 of the first electrode line L1 and the second electrode line L2 are completely offset from the first portions L51, L61 of the fifth electrode line L5 and the sixth electrode line L6. In some embodiments, a distance A8 between the first portions L51, L61 of the fifth electrode line L5 and the sixth electrode line L6 and an edge of the hole area H may be greater than a distance A7 between the first portions L11, L21 of the first electrode line L1 and the second electrode line L2 and an edge of the hole area H.

It is worth noting that although not shown in the drawings, the touch sensor 100a with a double-sided single-layer electrode structure in FIG. 3 may also have a hole area H with a rectangular shape or a pill shape shown in FIG. 2B and FIG. 2C. On the other hand, the touch sensor 100a of the present disclosure can also be a single-sided double-layer electrode structure. Specifically, the first touch electrode layer 120 and the second touch electrode layer 122 are both disposed on a side of the first surface or the second surface of the substrate 110, and are electrically insulated by an insulating layer. It should be understood that the component connection relationships, materials, and advantages described above will not be repeated hereinafter. In the following descriptions, the touch sensor 100 in FIG. 1 and FIG. 2A will be taken as an example to further discuss the manufacturing method of the touch sensor 100.

In some embodiments, the manufacturing method of the touch sensor 100 includes step S10 to step S14, and step S10 to step S14 can be performed sequentially. In step S10, a substrate 110 is provided, in which the substrate 110 has a first area and a second area respectively corresponding to the visible area VA and the peripheral area PA, and the first area of the substrate 110 is provided with a hole area H. In step S12, a conductive layer is formed on the first area of the substrate 110. In step S14, the conductive layer is patterned to form a first touch electrode layer 120, such that the first touch electrode layer 120 has a first electrode line L1 and a second electrode line L2, and a portion of the first electrode line L1 and a portion of the second electrode line L2 are disposed adjacent to edges of the hole area H along a contour of the hole area H. In the following descriptions, the aforementioned steps will be described in more detail.

Firstly, in step S10, a substrate 110 is provided, in which the substrate 110 has a first area and a second area respectively corresponding to the visible area VA and the peripheral area PA, and the first area of the substrate 110 is provided with a hole area H. In some embodiments, a distance A9 between an edge of the hole area H and a boundary between the first area and the second area is at least 100 µm. As such, the hole area H and the boundary can be separated by a certain distance, such that spaces are provided for disposing at least one electrode line L which is sufficient for touch sensing to maintain the touch resolution. In detail, when the distance A9 is less than 100 µm, the conductive layer located between the hole area H and the boundary may be insufficient or difficult to be patterned, thereby affecting the completeness of the electrode pattern near the hole area H and reducing the touch resolution.

Next, in step S12, a conductive layer at least including a metal nanowire (e.g., a silver nanowire material layer, a gold nanowire material layer, or a copper nanowire material layer) is formed on the first area of the substrate 110. In some embodiments, a dispersion or slurry with metal nanowires may be formed on the substrate 110 by coating, and the dispersion or slurry is then cured or dried to make the metal nanowires adhere to the surface of the substrate 110. After the above curing or drying step, a solvent and other substances in the dispersion or slurry will volatilize, and the metal nanowires can be randomly distributed on the surface of the substrate 110, or preferably, the metal nanowires can be fixed on surface of the substrate 110 without falling off to form the conductive layer. The metal nanowires in the conductive layer can contact each other to provide a continuous current path, so as to form a conductive network.

That is, the metal nanowires contact each other at their intersection positions to form a path for transferring electrons.

In some embodiments, the dispersion or slurry includes a solvent, such that the metal nanowires are uniformly dispersed in the solvent. Specifically, the solvent is, for example, water, alcohols, ketones, ethers, hydrocarbons, aromatic solvents (benzene, toluene, xylene, etc.), or combinations thereof. In some embodiments, the dispersion may further include additives, surfactants, and/or binding agents to improve the compatibility between the metal nanowires and the solvent and the stability of the metal nanowires in the solvent. Specifically, the additives, surfactants, and/or binding agents may be, for example, carboxymethyl cellulose, hydroxyethyl cellulose, hypromellose, fluorosurfactant, sulfosuccinate sulfonate, sulfate, phosphate, disulfonate, or combinations thereof. The dispersion or slurry including the metal nanowires can be formed on the surface of the substrate 110 in any manner, such as but not limited to processes such as screen printing, spray coating, or roller coating. In some embodiments, a roll-to-roll process may be performed, such that the dispersion or slurry including the metal nanowires is coated on the surface of the substrate 110 supplied continuously.

In some embodiments, post-treatments may be further performed on the metal nanowires to improve the contact characteristics (e.g., increase the contact area) of the metal nanowires at their intersection positions, so as to enhance the conductivity. The post-treatments may include steps such as, but not limited to, heating, plasma providing, corona discharging, ultraviolet providing, ozone providing, or pressurizing. Specifically, after the conductive layer is formed by curing or drying, a roller may be used to apply pressure thereon. In some embodiments, one or more rollers may be used to apply pressure onto the conductive layer. In some embodiments, the applied pressure may be between about 50 psi and about 3400 psi, preferably between about 100 psi and about 1000 psi, between about 200 psi and about 800 psi, or between about 300 psi and about 500 psi. In some embodiments, the heating and pressurizing steps of the post-treatments can be performed on the metal nanowires at the same time. For example, a pressure of about 10 psi to about 500 psi (or preferably a pressure of about 40 psi to about 100 psi) can be applied through the roller, and the roller can be heated to about 70° C. to about 200° C. (or preferably about 100° C. to about 175° C.) to enhance the conductivity of the metal nanowires. In some embodiments, the metal nanowires may be exposed to a reducing agent for the post-treatment. For example, the metal nanowires including silver nanowires may preferably be exposed to a silver reducing agent for the post-treatment. In some embodiments, the silver reducing agent may include a borohydride such as sodium borohydride, a boron nitrogen compound such as dimethylamine borane, or a gas reducing agent such as hydrogen. In some embodiments, the exposure time may be between about 10 seconds and about 30 minutes, preferably between about 1 minute and about 10 minutes.

Subsequently, in step S14, a patterning step is performed to define a pattern of the conductive layer, thereby forming the first touch electrode layer 120 disposed on the first area of the substrate 110. In some embodiments, the conductive layer adjacent to the hole area H may be patterned into a first electrode line L1 and a second electrode line L2 extending on two sides of the hole area H, and a portion of the first electrode line L1 and a portion of the second electrode line L2 are adjacent to edges of the hole area H along a contour of the hole area H. In other words, when the patterning of the conductive layer encounters the interference (or blocking) of the hole area H, the patterning of the conductive layer is performed along a contour of an edge of the hole area H. In some embodiments, the conductive layer farther from the hole area H may be patterned to form the aforementioned third electrode line L3, the fourth electrode line L4, and each electrode line L having a substantially straight shape. The aforementioned descriptions can be referenced for the detailed descriptions of each electrode line L, which will not be repeated hereinafter. In some embodiments, the patterning of the conductive layer may be performed by etching. When the metal nanowire in the conductive layer is a silver nanowire, the main component of the etching solution may be $H_3PO_4$ (with a volume ratio of about 55% to about 70% $H_3PO_4$ in the etching solution) and $HNO_3$ (with a volume ratio of about 5% to about 15% $HNO_3$ in the etching solution) to remove the silver material in the same process. In some other embodiments, the main component of the etching solution may be ferric chloride/nitric acid or phosphoric acid/hydrogen peroxide.

After step S14 is performed, step S16 can be selectively performed according to actual needs, such that the hole area H on the substrate 110 is formed into a through hole. In some embodiments, the through hole can be formed by, for example, stamping. After the above steps, the touch sensor 100 as shown in FIG. 1 can be formed, in which the hole area H can be a solid area or a through hole.

In some alternative embodiments, different process flows can be adopted to manufacture the touch sensor 100 of the present disclosure, so as to manufacture the touch sensor 100 in which the hole region H of the substrate 110 is a through hole. In detail, in this embodiment, the manufacturing method of the touch sensor 100 includes step S20 to step S26, and step S20 to step S26 can be performed sequentially. In step S20, a substrate 110 is provided, in which the substrate 110 has a first area and a second area respectively corresponding to the visible area VA and the peripheral area PA, and the first area of the substrate 110 is provided with a hole area H. In step S22, a conductive layer is formed on the first area of the substrate 110. In step S24, the hole area H is formed into a through hole, and in the meantime, a hole corresponding to the through hole is formed in the conductive layer. In step S26, the conductive layer is patterned to form a first touch electrode layer 120, such that the first touch electrode layer 120 has a first electrode line L1 and a second electrode line L2, and a portion of the first electrode line L1 and a portion of the second electrode line L2 are disposed adjacent to edges of the through hole along a contour of the through hole. In the following descriptions, only the adjusted steps will be described, and the descriptions of the aforementioned embodiment cam be referred to for the remaining omitted descriptions.

Since in step S22 to step S24, the conductive layer is first formed on the first area of the substrate 110, and then the through hole is formed in the substrate 110, a hole can be formed in the conductive layer corresponding to the through hole while forming the through hole. In other words, the through hole in the substrate 110 and the hole in the conductive layer are formed in a same process. In some embodiments, the through hole in the substrate 110 and the hole in the conductive layer may be formed by, for example, stamping. On the other hand, in step S26, a size of the hole can be enlarged when patterning the conductive layer, such that a certain distance is between the first electrode line L1 and the second electrode line L2 formed by the patterning and the through hole in the substrate 110. After the above steps, the touch sensor 100 of the present disclosure can also be formed. The specific structure is as described above and will not be repeated hereinafter.

In some other alternative embodiments, different process flows can be adopted to manufacture the touch sensor 100 of the present disclosure. Specifically, the aforementioned step S22 and step S24 can be reversed. In detail, in this embodiment, the manufacturing method of the touch sensor 100 includes step S30 to step S36, and step S30 to step S36 can be performed sequentially. In step S30, a substrate 110 is provided, in which the substrate 110 has a first area and a second area respectively corresponding to the visible area VA and the peripheral area PA, and the first area of the substrate 110 is provided with a hole area H. In step S32, the hole area H is formed into a through hole. In step S34, a conductive layer is formed on the first area of the substrate 110. In step S36, the conductive layer is patterned to form a first touch electrode layer 120, such that the first touch electrode layer 120 has a first electrode line L1 and a second electrode line L2, and a portion of the first electrode line L1 and a portion of the second electrode line L2 are disposed adjacent to edges of the through hole along a contour of the through hole. In the following descriptions, only the adjusted steps will be described, and the descriptions of the aforementioned embodiment cam be referred to for the remaining omitted descriptions.

Since in step S32 to step S34, the through hole is formed in the substrate 110 in advanced, and then the conductive layer is formed on the first area of the substrate 110, there is no need for forming additional holes in the conductive layer. In addition, the conductive layer is formed to selectively avoid the position of the through hole. After the above steps, the touch sensor 100 of the present disclosure can also be formed. Since the manufacturing methods of the touch sensor 100 provided in the present disclosure all enable the touch sensor 100 to be provided with a certain yield, the process flows can be flexibly adjusted according to actual needs to improve the convenience in the manufacturing process.

Figure 5A:
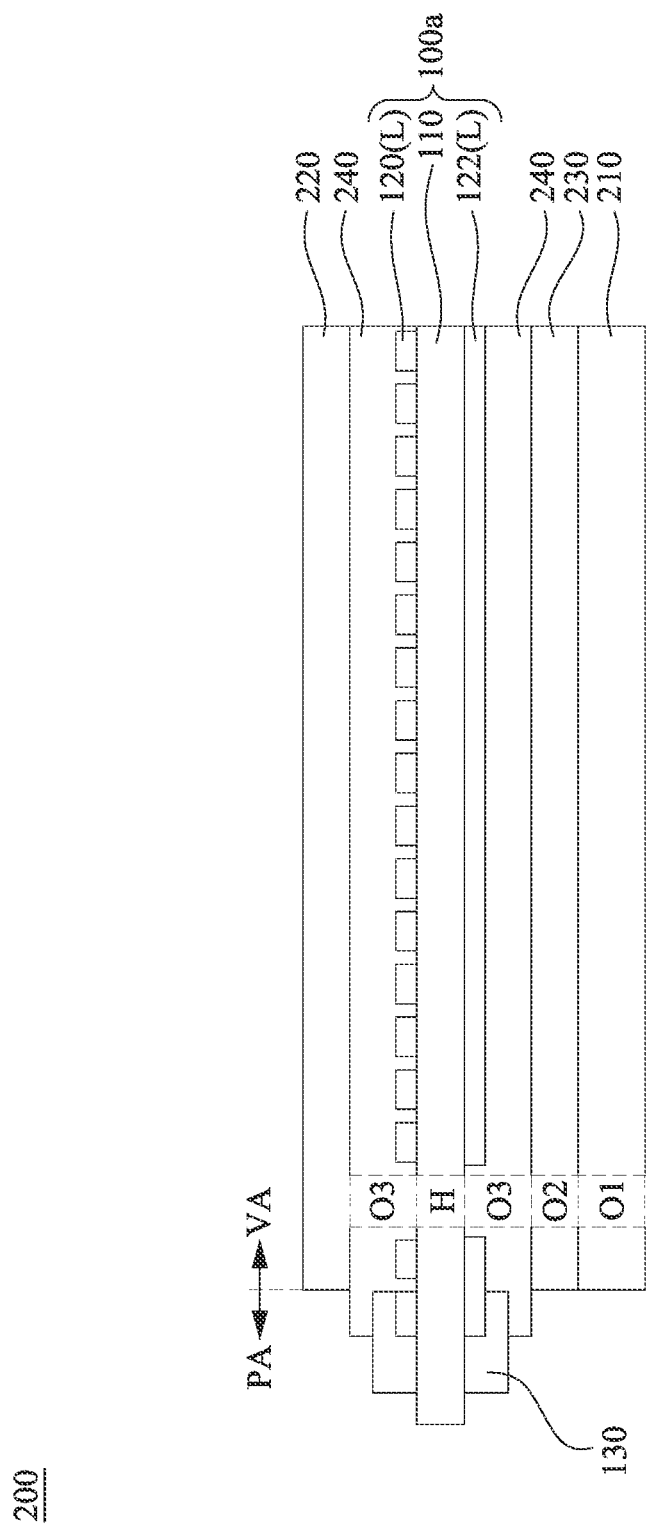
FIG. 5A is a cross-sectional view illustrating a touch display module according to some embodiments of the present disclosure.

FIG. 5A is a cross-sectional view illustrating a touch display module 200 according to some embodiments of the present disclosure. In some embodiments, the aforementioned touch sensor (taking the touch sensor 100a of FIG. 3 as an example) can be integrated into a touch display module 200 such as a display, a portable phone, a tablet computer, etc. The touch display module 200 can be provided with the aforementioned advantages. In some embodiments, the touch display module 200 includes a display panel 210 and the touch sensor 100a, and the touch sensor 100a is disposed on the display panel 210. In some embodiments, the display panel 210 may be, for example, an organic light emitting diode (OLED) panel. In some embodiments, the display panel 210 may have flexibility to realize the bending requirement of the touch display module 200 together with the touch sensor 100a.

In some embodiments, the touch display module 200 further includes a cover 220. The cover 220 and the display panel 210 jointly sandwich the touch sensor 100a therebetween. In the overall stacking structure, the touch sensor 100a and the cover 220 are sequentially stacked on the display panel 210. In some embodiments, the cover 220 may include a flexible material with flexibility, which refers to a material having certain strength and certain flexibility in the industry. For example, such materials may include polyimide, polycarbonate, polyvinyl chloride, polystyrene, polyether sulfide, polyester, polyamide amine, polybutene, polyethylene, polymethyl methacrylate, polybutylene terephthalate, polyethylene terephthalate, polyether ether ketone, polyurethane, polyether imide, polytetrafluoroethylene, acrylic, or combinations thereof. As such, the cover 220 and the touch sensor 100a can jointly realize the bending requirement of the touch display module 200.

In some embodiments, the touch display module 200 further includes a polarizing layer 230, which may be, for example, a liquid crystal coated polarizing layer. In some embodiments, the polarizing layer 230 may be disposed between the display panel 210 and the touch sensor 100a. For example, the polarizing layer 230 may be directly formed on a surface of the display panel 210. That is, a structure layer (not shown) of the display panel 210 is used as a substrate to form the polarizing layer 230. In some embodiments, the polarizing layer 230 may have flexibility to realize the bending requirement of the touch display module 200 together with the touch sensor 100a.

In some embodiments, the touch display module 200 further includes a protective layer 240. The protective layer 240 may, for example, cover an entire surface of the touch sensor 100a. That is, the protective layer 240 covers the first touch electrode layer 120 and the peripheral circuit layer 130 of the touch sensor 100a, and fills between the adjacent electrode lines L and the adjacent peripheral circuits to provide electrical insulation. In some embodiments, the protective layer 240 may be a hard coating layer including an insulating material, such as but not limited to non-conductive resin or other organic materials. In some embodiments, the protective layer 240 has flexibility to realize the bending requirement of the touch display module 200 together with the touch sensor 100a. In addition, an adhesive layer, such as an optically clear adhesive, can be selectively disposed between each layer to facilitate the bonding between the layers.

For the aforementioned layers, the display panel 210, the polarizing layer 230, and the protective layer 240 can be respectively provided with holes O1-O3 corresponding to the hole area H of the touch sensor 100a, such that the optical components can be disposed corresponding to the hole area H and the holes O1-O3. For example, the optical component may be disposed on a surface of the display panel 210 facing away from the touch sensor 100a, and corresponding to the hole area H and the holes O1-O3. As such, a touch display module 200 having an optical component corresponding to the visible area VA can be formed, thereby realizing the requirement of narrow bezel for the touch display module 200. In some embodiments, the optical component can be further accommodated in the holes O1-O3 according to actual needs, and the actual accommodating depths of the optical component in the holes O1, O2, and even the holes O3 can be designed as deemed necessary.

Figure 5B:
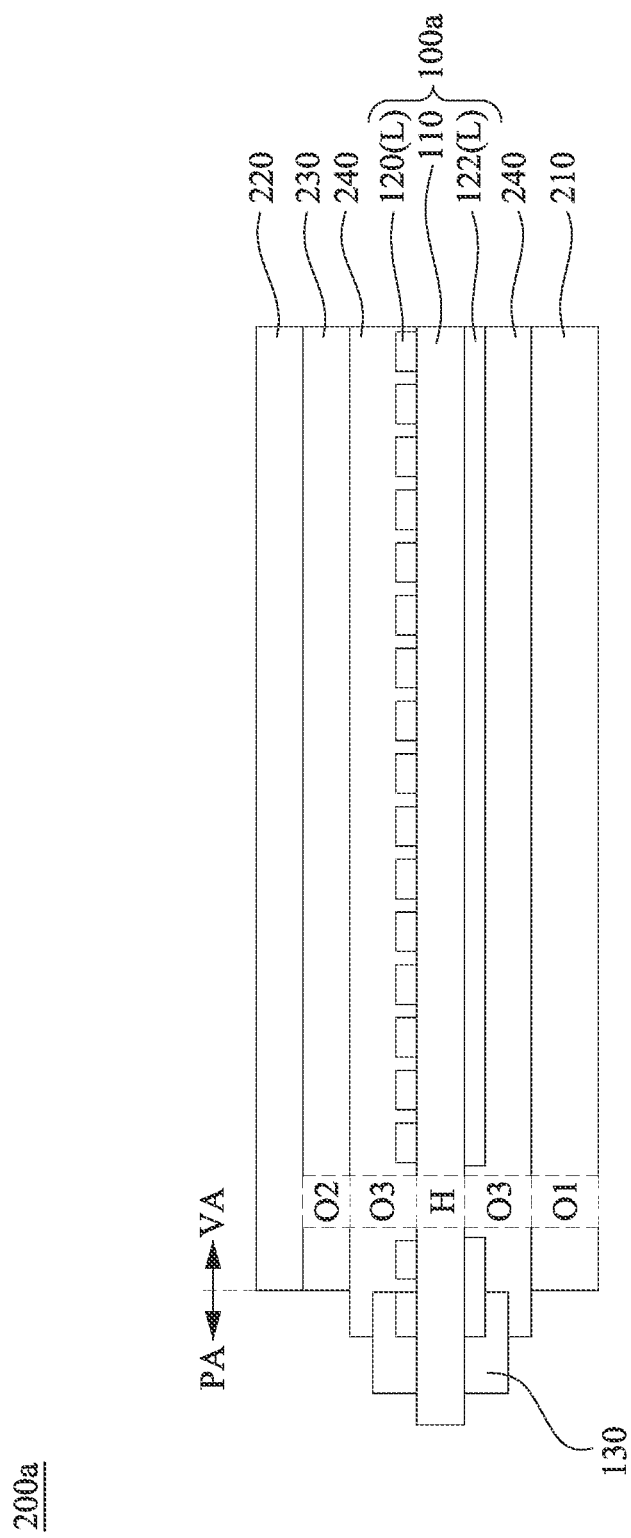
FIG. 5B is a cross-sectional view illustrating a touch display module according to some other embodiments of the present disclosure.

FIG. 5B is a cross-sectional view illustrating a touch display module 200a according to some other embodiments of the present disclosure. At least one difference between the touch display module 200a of FIG. 5B and the touch display module 200 of FIG. 5A lies in that the polarizing layer 230 of the touch display module 200a can be disposed between the touch sensor 100a and the cover 220. For example, the polarizing layer 230 may be directly formed on a surface of the cover 220. That is, the cover 220 is used as a substrate to form the polarizing layer 230.

According to the aforementioned embodiments of the present disclosure, since the touch sensor of the present disclosure has a hole area disposed corresponding to the visible area, when the touch sensor is integrated into a touch display module with optical functions, the optical components of the touch display module can be disposed corresponding to the hole area. As a result, spaces in the peripheral area for disposing the optical components can be saved, and the design requirement of narrow bezel for the touch display module is further achieved. In addition, since the optical components of the touch display module are disposed corresponding to the visible area, the arrangement of the peripheral wires in the peripheral area of the touch sensor disposed do not need to avoid the position of the optical components, and the bending of the peripheral area is not restricted by the optical components. Accordingly, the touch sensor is able to achieve diversified bending designs. On the other hand, through the arrangement of the touch electrodes and the design of the electrode patterns in the touch electrode layer, the touch electrodes can maintain a good touch function while bypassing the hole area. In addition, in the manufacturing process of the touch sensor of the present disclosure, the manufacturing steps can be flexibly adjusted according to actual needs, thereby improving the convenience in the manufacturing process.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A touch sensor having a visible area and a peripheral area on at least one side of the visible area, comprising:
a substrate having a hole area corresponding to the visible area, wherein the hole area has a first edge; and
a first touch electrode layer disposed on the substrate and corresponding to the visible area, wherein the first touch electrode layer comprises a first electrode line extending along a first direction, the first electrode line has a first portion close to the hole area, a second portion far from the hole area along the first direction, and a third portion far from the hole area along the first direction, the first portion of the first electrode line is connected to the second portion of the first electrode line and the third portion of the first electrode line, the first portion of the first electrode line is disposed adjacent to the first edge along a contour of the hole area, and the second portion of the first electrode line and the third portion of the first electrode line are electrically coupled in parallel to the first portion of the first electrode line.

2. The touch sensor of claim 1, wherein the first touch electrode layer comprises a matrix and a plurality of metal nanostructures distributed in the matrix.

3. The touch sensor of claim 1, wherein the hole area further has a second edge, and a portion of the second edge and a portion of the first edge are located on opposite sides of the hole area.

4. The touch sensor of claim 3, wherein the first touch electrode layer further comprises a second electrode line extending along the first direction, the second electrode line is disposed adjacent to and spaced apart from the first electrode line, the second electrode line has a first portion close to the hole area and a second portion far from the hole area along the first direction, the first portion of the second electrode line is connected to the second portion of the second electrode line, and the first portion of the second electrode line is disposed adjacent to the second edge along the contour of the hole area.

5. The touch sensor of claim 4, wherein a distance between the first portion of the first electrode line and the first portion of the second electrode line is greater than a distance between the second portion of the first electrode line and the second portion of the second electrode line.

6. The touch sensor of claim 4, wherein at least a portion of the first portion of the first electrode line is spaced apart from at least a portion of the first portion of the second electrode line by the hole area.

7. The touch sensor of claim 4, wherein the second portion of the first electrode line and the second portion of the second electrode line are substantially parallel.

8. The touch sensor of claim 4, wherein a distance between the first portion of the first electrode line and the first edge of the hole area is between 100 µm and 400 µm, and a distance between the first portion of the second electrode line and the second edge of the hole area is between 100 µm and 400 µm.

9. The touch sensor of claim 4, wherein a connection of the first portion of the first electrode line and the second portion of the first electrode line has a round corner, and a connection of the first portion of the second electrode line and the second portion of the second electrode line has a round corner.

10. The touch sensor of claim 1, wherein the touch sensor further comprises a second touch electrode layer, the substrate has a first surface and a second surface facing away from the first surface, and the first touch electrode layer and the second touch electrode layer are respectively disposed on the first surface and the second surface of the substrate; or the first touch electrode layer and the second touch electrode layer are disposed on a side of the first surface or the second surface of the substrate, and electrically insulated by an insulating layer.

11. The touch sensor of claim 10, wherein the second touch electrode layer comprises a fifth electrode line extending along a second direction, the second direction is perpendicular to the first direction, the fifth electrode line has a first portion close to the hole area and a second portion far from the hole area along the second direction, the first portion of the fifth electrode line is connected to the second portion of the fifth electrode line, and the first portion of the fifth electrode line is disposed adjacent to an edge of the hole area along the contour of the hole area.

12. A touch display module, comprising:
a display panel; and
the touch sensor of claim 1 disposed on the display panel.

13. The touch display module of claim 12, further comprising:
a cover disposed on the touch sensor.

14. The touch display module of claim 13, further comprising:
a polarizing layer disposed between the display panel and the touch sensor, or between the touch sensor and the cover.

15. The touch display module of claim 12, wherein the display panel has a hole corresponding to the hole area.

16. The touch display module of claim 15, further comprising:
an optical component accommodated in the hole.

17. A touch sensor having a visible area and a peripheral area on at least one side of the visible area, comprising:
a substrate having a hole area corresponding to the visible area, wherein the hole area has a first edge; and a first touch electrode layer disposed on the substrate and corresponding to the visible area, wherein the first touch electrode layer comprises a first electrode line extending along a first direction, the first electrode line has a first portion close to the hole area, a second portion far from the hole area along the first direction, and a third portion far from the hole area along the first direction, a first end of the first portion of the first electrode line is connected to the second portion of the first electrode line, a second end of the first portion of the first electrode line is connected to the third portion of the first electrode line, and the first portion of the first electrode line is disposed adjacent to the first edge along a contour of the hole area.

18. A touch sensor having a visible area and a peripheral area on at least one side of the visible area, comprising:
   a substrate having a hole area corresponding to the visible area, wherein the hole area has a first edge; and
   a first touch electrode layer disposed on the substrate and corresponding to the visible area, wherein the first touch electrode layer comprises a first electrode line extending along a first direction, the first electrode line has a first portion close to the hole area and a second portion far from the hole area along the first direction, the first portion of the first electrode line is connected to the second portion of the first electrode line, the first portion of the first electrode line is disposed adjacent to the first edge along a contour of the hole area, and wherein the first electrode line comprises a plurality of branch lines disposed at intervals, and the branch lines are connected in parallel.

19. The touch sensor of claim 18, wherein when the branch lines simultaneously encounter the hole area along the first direction, and the branch lines are combined together to be adjacent to the first edge of the hole area along the contour of the hole area.

20. The touch sensor of claim 19, wherein the first electrode line of the first touch electrode layer further has a third portion, the second portion of the first electrode line and the third portion of the first electrode line constitute two of the branch lines of the first electrode line, and the third portion is connected to the first portion of the first electrode line, such that the first portion of the first electrode line constitutes a portion which the branch lines are combined together into.

* * * * *